United States Patent
Zander et al.

(10) Patent No.: US 11,974,360 B2
(45) Date of Patent: Apr. 30, 2024

(54) METHODS FOR POLARIZATION REPORTING; RELATED WIRELESS DEVICES AND RELATED NETWORK NODES

(71) Applicant: Sony Group Corporation, Tokyo (JP)

(72) Inventors: Olof Zander, Lund (SE); Fredrik Rusek, Esloev (SE); Erik Bengtsson, Lund (SE); Kun Zhao, Malmö (SE)

(73) Assignee: Sony Group Corporation, Tokyo (JP)

( * ) Notice: Subject to any disclaimer, the term of this patent is extended or adjusted under 35 U.S.C. 154(b) by 204 days.

(21) Appl. No.: 17/428,031

(22) PCT Filed: Jan. 14, 2020

(86) PCT No.: PCT/SE2020/050031
§ 371 (c)(1),
(2) Date: Aug. 3, 2021

(87) PCT Pub. No.: WO2020/167195
PCT Pub. Date: Aug. 20, 2020

(65) Prior Publication Data
US 2022/0109977 A1    Apr. 7, 2022

(30) Foreign Application Priority Data

Feb. 15, 2019 (SE) .................... 1950182-4

(51) Int. Cl.
*H04W 8/24* (2009.01)
*H04B 7/0413* (2017.01)

(52) U.S. Cl.
CPC ............ *H04W 8/24* (2013.01); *H04B 7/0413* (2013.01)

(58) Field of Classification Search
CPC ...... H04B 7/0408; H04B 7/0413; H04W 8/24
See application file for complete search history.

(56) References Cited

U.S. PATENT DOCUMENTS

| | | | |
|---|---|---|---|
| 2017/0033848 A1 | 2/2017 | Cordeiro | |
| 2018/0034623 A1 | 2/2018 | Shirinfar | |

(Continued)

FOREIGN PATENT DOCUMENTS

| | | | |
|---|---|---|---|
| CN | 1870503 A | 11/2006 | |
| CN | 101047484 A | 10/2007 | |

(Continued)

OTHER PUBLICATIONS

Swedish Search Report from corresponding Swedish Application No. 1950182-4, dated Aug. 27, 2019, 2 pages.

(Continued)

*Primary Examiner* — Rahel Guarino
(74) *Attorney, Agent, or Firm* — Tucker Ellis LLP

(57) ABSTRACT

A method performed in a wireless device is disclosed. The present disclosure provides a method, performed in a wireless device, for polarization reporting. The wireless device is configured to communicate with a network node using a plurality of antenna panels of the wireless device, including a first antenna panel. The method comprises generating, based on one or more polarization properties of the first antenna panel, a first polarization indicator associated with a first identifier. The first identifier is indicative of the first antenna panel. The method comprises transmitting a capability report to the network node, the capability report comprising the first polarization indicator associated with the first identifier.

14 Claims, 5 Drawing Sheets

(56) References Cited

U.S. PATENT DOCUMENTS

| | | | |
|---|---|---|---|
| 2018/0063693 A1* | 3/2018 | Chakraborty | H04W 8/005 |
| 2019/0028167 A1 | 1/2019 | Chang | |
| 2019/0089437 A1* | 3/2019 | Chen | H04B 7/0617 |
| 2020/0083939 A1 | 3/2020 | Park | |
| 2020/0107327 A1 | 4/2020 | Wang | |
| 2021/0167821 A1* | 6/2021 | Chen | H04B 7/0617 |

FOREIGN PATENT DOCUMENTS

| | | |
|---|---|---|
| CN | 108141255 A | 6/2018 |
| CN | 108476050 A | 8/2018 |
| EP | 2797240 A1 | 10/2014 |
| EP | 3562052 A1 | 10/2019 |
| KR | 20180135874 A | 12/2018 |
| WO | WO-2018082550 A1 | 5/2018 |
| WO | WO-2018171355 A1 | 9/2018 |
| WO | WO-2018182381 A1 | 10/2018 |
| WO | WO-2018232294 A1 | 12/2018 |

OTHER PUBLICATIONS

International Search Report and Written Opinion from corresponding International Application No. PCT/SE2020/050031, dated Mar. 27, 2020, 16 pages.

LG Electronics, R1-1901429, Feature lead summary of Enhancements on Multi-beam Operations, 3GPP TSG RAN WG1 #AH, (3GPP Server Publication Date: Jan. 24, 2019).

Chinese Office Action dated Jan. 24, 2024 for Application Serial No. 202080013925 (5 pages).

* cited by examiner

METHODS FOR POLARIZATION REPORTING; RELATED WIRELESS DEVICES AND RELATED NETWORK NODES

The present disclosure pertains to the field of wireless communications. More specifically, the present disclosure relates to methods for polarization reporting, related wireless devices and related network nodes.

BACKGROUND

Wireless devices may be equiped with a plurality of antenna elements or antenna panels forming the antenna structure and each antenna element or antenna panel may have different antenna properties.

The wireless device may move and the movement may affect the performance of polarization of the one or more antenna elements of the wireless device with respect to the antenna arrangement of the network node.

The wireless device may adjust its receive beam in order to find the direction that is associated with the strongest synchronization signal.

However, the polarization of the synchronization signal may not be optimal for the wireless device or for the network node depending on the current arrangement of the antenna elements on each side.

The network node is not capable of identifying the polarization used by the antenna elements of the wireless device.

SUMMARY

Accordingly, there is a need for wireless devices and methods, performed in a wireless device which mitigate, alleviate or address the shortcomings existing. Embodiments herein provide an improved capability reporting to the network node, thereby facilitating that the network node can optimise communication with the wireless device according to the polarization. For example, a network node disclosed herein receiving a strong signal from an antenna panel identified as disclosed and indicating two polarisations, is capable of requesting from the wireless device transmission of a reference signal in the same spatial direction but orthogonally polarized.

The present disclosure provides a method, performed in a wireless device, for polarization reporting. The wireless device is configured to communicate with a network node using a plurality of antenna panels of the wireless device, including a first antenna panel. The method comprises generating, based on one or more polarization properties of the first antenna panel, a first polarization indicator associated with a first identifier. The first identifier is indicative of the first antenna panel. The method comprises transmitting a capability report to the network node, the capability report comprising the first polarization indicator associated with the first identifier.

Further, a wireless device is provided, the device comprising: a wireless interface module comprising a plurality of antenna panels, a memory module, and a processing module, wherein the wireless device is configured to perform any of the methods described herein.

The present disclosure provides a method, performed in a network node, for adapting a transmission strategy. The network node is configured to communicate with a wireless device. The method comprises receiving a capability report from the wireless device, the capability report comprising a polarization indicator associated with an identifier indicative of an antenna panel of the wireless device. The method comprises adapting the transmission strategy to the wireless device according to the polarization indicator.

Finally, a network node is provided, the network node comprising: a wireless interface module, a memory module, and a processing module, wherein the network node is configured to perform any of the methods described herein.

It is an advantage of the present disclosure that the network node can optimise the communication with the wireless device based on the capability report disclosed herein from the wireless device, and thereby adjust the communication strategy according to the polarization properties of the signal received from the wireless device.

Thereby, the network node is capable of determining whether to use or not Multiple-Input and Multiple-Output (MIMO), and of requesting the wireless device to send a Sound Reference Signal (SRS) based on the polarization properties.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
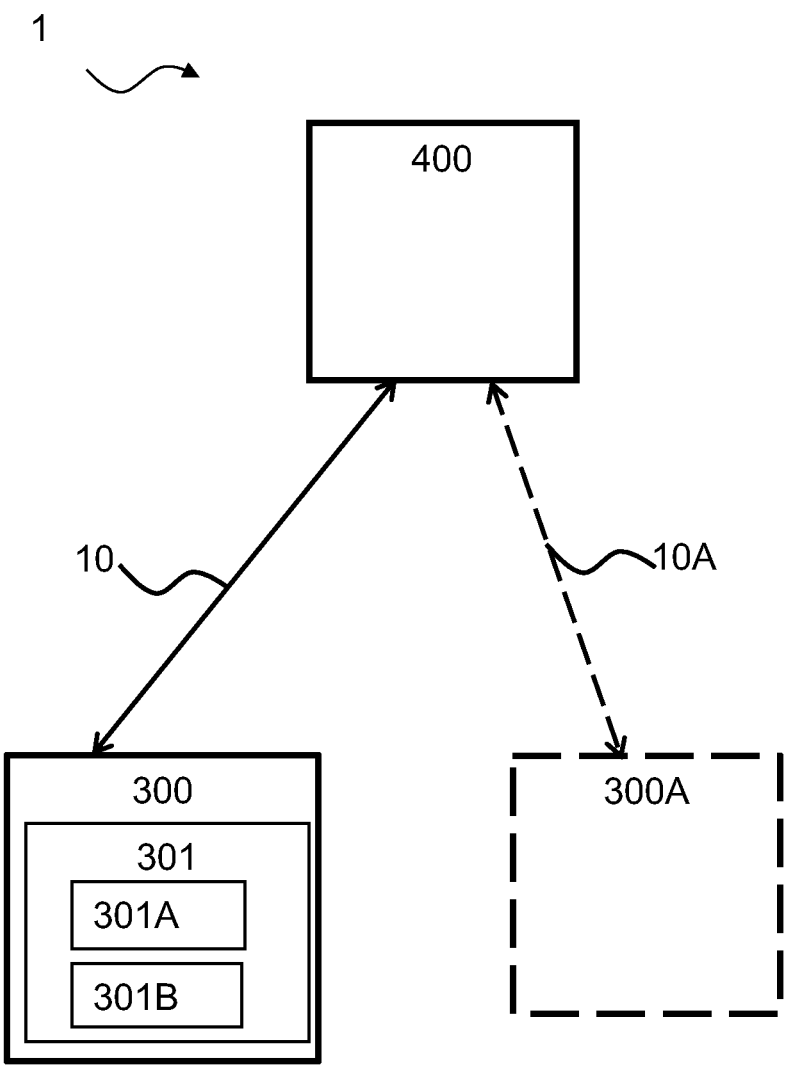
FIG. 1 is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

It is envisaged that, in the $3^{rd}$ Generation Partnership Project, 3GPP systems, (e.g. new radio, NR), a wireless device is equipped with multiple antenna panels. Some antenna panels may comprise dually polarized antennas (i.e., patch antennas), and other antenna panels may not. For uplink (UL) SRS transmission, mechanisms are discussed herein to include an identification (ID) e.g. to the SRS indicating which antenna panel has transmitted the SRS. The present disclosure exploits information about the antenna panel used to transmit e.g. an SRS signal.

NR revolves around operating based on a beam-pair, i.e., a transmission-beam (tx-beam) at the wireless device (e.g. at a UE for UL) and a receive-beam (rx-beam) at the network node (e.g. at a gNB and/or base station (BS)). When an SRS transmitted from the wireless device is received at the network node with high signal strength, the network node has no information about the antenna structure or polarization properties, it may be difficult for the network node to determine whether: 1) there is another tx-beam of similar strength (because the SRS was transmitted from a dually-polarized panel), or 2) there is no other tx-beam of similar strength (because the SRS was transmitted from a single-polarized panel). When the network node knows about the polarization properties associated with the antenna structure, the network node disclosed herein may decide to use MIMO in the case of situation 1) and not to use MIMO in the case of situation 2).

In other words, upon receiving an SRS from a wireless device, it is judicious for the network node to know whether or not there is another tx-beam from the wireless device in the same physical direction that is orthogonally polarized.

The present disclosure proposes to exploit identifier related to the antenna panel to make the corresponding antenna panel polarization information available to the network node (e.g., a gNB) via a capability report.

For example, if the network node (e.g., a gNB) knows that there is an orthogonally polarized beam in the same direction, then that beam can be expected to be of similar quality, thereby facilitating polarization MIMO, or spurring (possibly triggering) the network node to request the wireless device (e.g., UE) to send SRS also in the other polarization. If it knows that there is not (i.e. that there is no orthogonally polarized beam in the same direction), there is no need for the network node to consider polarization MIMO.

The figures are schematic and simplified for clarity, and they merely show details which are essential to the understanding of the invention, while other details have been left out. Throughout, the same reference numerals are used for identical or corresponding parts.

FIG. 1 is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a network node 400. The wireless device 300 is configured to communicate with a network of the wireless communication system 1 via a network node 400.

A network node disclosed herein refers to a radio network node, such as a radio access network node operating in the radio access network, such as a BS, an eNB, and/or a gNB. The network node may comprise a transmission reception point, TRP. In one or more embodiment, the network node may comprise a plurality of TRPs.

The wireless communication system 1 described herein may comprise one or more wireless devices 300, 300A, and/or one or more network nodes 400, such as one or more of: a BS, an eNB, a gNB and/or an access point.

A network node may refer to an entity of a wireless network of the wireless communication system, used for establishing and controlling an air interface for communication with one or more wireless devices.

A wireless device may refer to as one or more of: a mobile device, a mobile or stationary computer, a tablet, a smart wearable device, and a smart phone device. In specifications under 3GPP, a wireless device is generally referred to as a user equipment, UE.

The wireless device 300, 300A may be configured to communicate with the network node 400 via a wireless link (or radio access link) 10, 10A. The wireless device 300 comprises a wireless interface module 301 (e.g. an antenna panel module) comprising a plurality of antenna panels 301A, 301B including a first antenna panel 301A and optionally a second antenna panel 301B. The wireless device 300 comprises a wireless interface module 301 comprising the plurality of antenna panels 301A, 301B.

An antenna panel may comprise one or more antenna elements, e.g. one or more antenna arrays comprising one or more antenna elements.

An antenna panel may be identified by an identifier, e.g. an antenna panel identifier and/or a beam identifier. An antenna panel identifier as disclosed herein refers to an identifier which identifies an antenna panel, and/or an antenna subpanel. An antenna panel identifier may be seen a parameter establishing the identity of an antenna panel amongst the plurality of antenna panels of the wireless device. A beam identifier may refer to an identifier identifying a beam of the antenna panel. For example, a beam identifier indicates which beam is used for transmission, and the antenna panel identifier indicates from which antenna panel the beam was sent. Seen from the network node perspective, a beam identifier may be used to identify the antenna panel.

In one or more example wireless devices, the first antenna panel 301A and the second antenna panel 301B may be arranged spaced apart in the wireless device.

It may be envisaged that two or more antenna panels form an antenna arrangement.

In one or more example embodiments, the first antenna panel 301A is configured to receive and/or transmit radio signals in a first direction via a first beam, whereas the second antenna panel is configured to receive and/or transmit radio signals in a second direction via a second beam. The wireless device 300 is thereby configured to communicate with the network node using spatial diversity and/or transmit/receive diversity. For example, the first direction may be different from the second direction. In other words, the first beam and second beam may have different directions, e.g. different spatial directions.

The present disclosure provides that the wireless device 300 exploits the antenna panel identifier of 3GPP systems and/or a beam identifier to make the corresponding antenna panel polarization information available to the network node 400 (e.g., a gNB) via a capability report. This way, the network node 400 is capable of identifying whether MIMO can be used for a specific beam.

For example, when the network node 400 obtains, based on the disclosed capability report (comprising a polarization indicator associated with an identifier of an antenna panel), that there is an orthogonally polarized beam in the same direction, then that beam can be expected to be of similar quality, thereby facilitating polarization MIMO, or spurring the network node 400 to request the wireless device 300 to send SRS also in the other polarization. For example, when the network node 400 determines based on the disclosed capability report (comprising a polarization indicator associated with an identifier of an antenna panel) that there is no dual polarization (i.e. that there is no orthogonally polarized beam in the same direction), there is no need for the network node to consider polarization MIMO within the same spatial beam.

Figure 2:
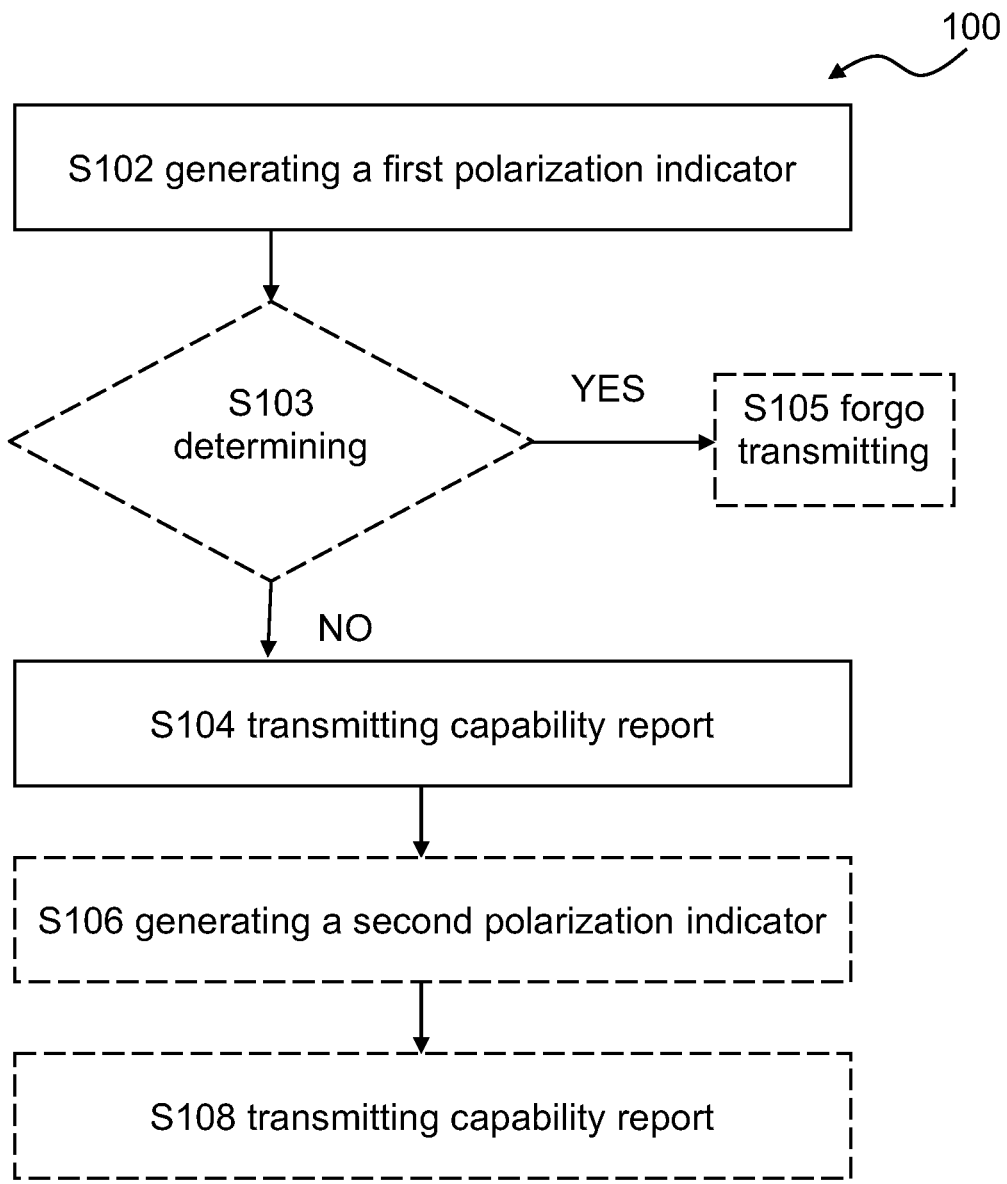
FIG. 2 is a flow-chart illustrating an exemplary method, performed in a wireless device, for polarization reporting to a network node of a wireless communication system according to this disclosure.

FIG. 2 shows a flow diagram of an example method 100, performed by a wireless device, according to the disclosure.

The method 100 is performed in a wireless device for polarization reporting. The wireless device is configured to communicate with a network node using a plurality of antenna panels of the wireless device, including a first antenna panel.

The method 100 comprises generating S102, based on one or more polarization properties of the first antenna panel, a first polarization indicator associated with a first identifier. The first identifier may be indicative of the first antenna panel. In one or more example methods, a first identifier is an identifier identifying the first antenna panel. For example, an identifier indicative of an antenna panel may comprise a beam identifier (e.g. beam ID transmitted by the antenna panel) and/or an antenna panel identifier (e.g. panel ID).

Generating S102, based on one or more polarization properties of the first antenna panel, a first polarization indicator associated with a first identifier may comprise generating, based on one or more polarization properties of the first antenna panel, a first polarization indicator associated with a first antenna panel identifier and/or a first beam identifier.

The method 100 comprises transmitting S104 a capability report to the network node, the capability report comprising the first polarization indicator associated with the first identifier.

For example, with the disclosed capability reporting made by the wireless device (e.g. a UE), information about the number of polarizations per antenna panel (e.g. the first antenna panel) is reported by the first polarization indicator associated with the first identifier to the network node.

For example, when the first antenna panel is single polarized (i.e. has one polarization), the capability report may include a flag set to 1 or any predetermined other value and the first identifier to indicated to the network node that the first antenna panel has a single polarization. For example, when the first antenna panel is dual polarized (i.e. has two polarizations), the capability report may include a flag set to 2 or any predetermined other alternative value and the first identifier to indicated to the network node that the first antenna panel has a dual polarization.

In one or more example methods, the plurality of antenna panels includes a second antenna panel. In one or more example methods, the method 100 comprises generating S106, based on one or more polarization properties of the second antenna panel, a second polarization indicator associated with a second identifier. The second identifier may be indicative of the second antenna panel. In one or more example methods, the second identifier indicative of the second antenna panel comprises a second antenna panel identifier and/or a second beam identifier.

In one or more example methods, the method 100 comprises transmitting S108 the capability report to the network node. The capability report may comprise the second polarization indicator associated with the second identifier. In one or more example methods, the capability report comprises the first polarization indicator associated with the first identifier for the first antenna panel and the second polarization indicator associated with the second identifier for the second antenna panel.

In one or more example methods, the first identifier indicative of the first antenna panel comprises a first antenna panel identifier and/or a first beam identifier. An antenna panel identifier as disclosed herein (e.g. the first antenna panel identifier) refers to an identifier which identifies an antenna panel. A beam identifier (e.g. the first beam identifier) may refer to an identifier identifying a beam of the antenna panel. For example, a beam identifier indicates which beam is used for transmission, and the antenna panel identifier indicates from which antenna panel the beam was sent. Seen from the network node perspective, a beam identifier may be used to identify the antenna panel. Advantageously, the polarization indicator (e.g. information of polarization properties) may be attached to the beam identifier in the capability report. For example, the polarization indicator may indicate if the beam is sent from a single polarized antenna panel or a dually polarized antenna panel. In the latter case, the polarization indicator may comprise an indicator indicating which particular polarization the beam has. This may improve performance since the polarization indicator reported to the network node (e.g. gNB) indicates whether or not both polarizations within a certain direction have actually been sent or not.

In one or more example methods, the second identifier indicative of the second antenna panel comprises a second antenna panel identifier and/or a second beam identifier.

In one or more example methods, the antenna panel identifier may be changed dynamically. For example, an antenna panel including both single and dually polarized antennas may in some scenarios be seen as two antenna panels, where one antenna panel may have single polarized antennas and the other antenna panel may have dual polarized antennas. Therefore, the present disclosure allows the polarization indicator to adjust dynamically. In one or more example methods, the first antenna panel forms part of an antenna panel module comprising the plurality of antenna panels. In other words, the first antenna panel in one or more exemplary embodiments may be a sub-part of the antenna panel module. In one or more exemplary embodiments, the antenna module may comprise sub-panels with varying polarization properties. It may be envisaged that a part of an antenna module is composed of dually polarized antennas. In other words, an antenna module may include both single and dually polarized antenna panels or antenna elements. The disclosed polarization indicator associated with the identifier related to the antenna panel forming part of the antenna module comprising the plurality of antenna panels allows indicating to the network node (e.g. gNB) during the capability reporting the polarization properties per antenna panel of the antenna module.

It may be appreciated that an antenna panel may be seen as comprising sub-panels. In one or more embodiments, the disclosed polarization indicator is associated with the identifier related to the sub-panel forming part of the antenna panel comprising a plurality of antenna sub-panels. The disclosed polarization indicator allows indicating to the network node (e.g. gNB) during the capability reporting the polarization properties per sub-panel of the antenna panel.

In one or more example methods, the one or more polarization properties of the first and/or second antenna panel comprise a number of polarizations, and/or a frequency band. In one or more example methods, polarization properties may be different based on e.g. frequency band. Optionally, the one or more polarization properties may comprise an antenna port association (e.g. how many digital ports an antenna panel has).

The method according to any of the previous claims, the method comprising:

determining (S103) if the first polarization indicator associated with the first identifier has been transmitted previously by the wireless device, 100 comprises, when it is determined that the first polarization indicator associated with the first identifier has not been transmitted previously by the wireless device, transmitting S104 the capability report to the network node, the capability report comprising the first polarization indicator associated with the first identifier. For example, the capability report comprising the polarization indicator associated with the identifier (e.g. first antenna panel identifier) of the SRS-transmitting panel, is shared with the network node (e.g. a gNB). However, this increases the overhead that is carried (transmitted) when this is signaled repeatedly. Advantageously, the present disclosure provides that the polarization indicator associated with the identifier is transmitted at a first instance, thereby reducing the overhead. In one or more example methods, the method 100 comprises, when it is determined that the first polarization indicator associated with the first identifier has been transmitted previously by the wireless device, forgoing S105 the transmitting of the capability report comprising the first polarization indicator associated with the first identifier, to the network node. For example, when the same identifier is transmitted a second time in a capability report, the capability report is generated so as to no contain the polarization indicator.

100, when it is determined that the second polarization indicator associated with the second identifier has been transmitted previously by the wireless device, forgoing the transmitting of the capability report comprising the second polarization indicator associated with the second identifier, to the network node.

Figure 3:
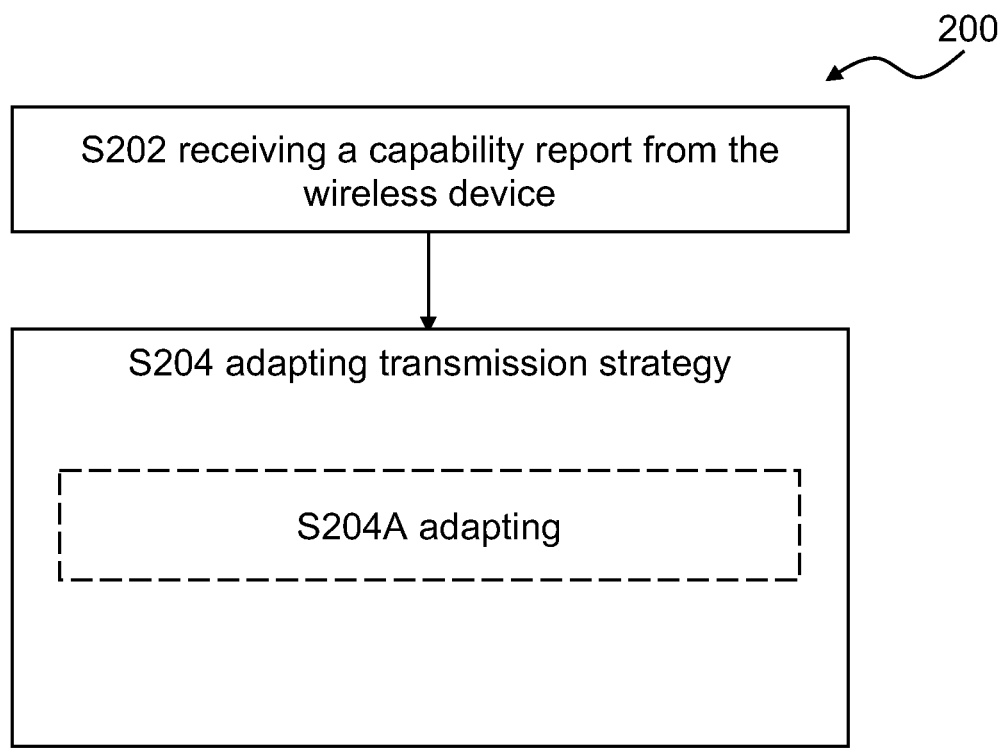
FIG. 3 is a flow-chart illustrating an exemplary method, performed in a network node of a wireless communication system, for adapting a transmission strategy according to this disclosure.

FIG. 3 shows a flow diagram of an example method 200, performed by a network node, according to the disclosure. The method 200 is performed in a network node (e.g. network node 400 of FIGS. 1 and 5), for adapting a transmission strategy. The network node is configured to communicate with a wireless device. The method 200 comprises receiving S202 a capability report from the wireless device, the capability report comprising a polarization indicator associated with an identifier indicative of an antenna panel of the wireless device. In one or more example methods, the polarization indicator is indicative of a polarization property of an antenna panel of the wireless device.

The method 200 comprises adapting S204 the transmission strategy to the wireless device according to the polarization indicator.

In one or more example methods, the polarization property comprises a number of polarizations, and/or a frequency band.

in one or more example methods, the method 200 comprises, when the polarization indicator indicates a dual polarization of the antenna panel, adapting S204 the transmission strategy to the wireless device according to the polarization indicator comprises enabling S204A polarization-based multiple input multiple output, MIMO, communication. For example, polarization-based multiple input multiple output, MIMO, communication is performed over at least two beams of the antenna panel corresponding to the identifier (e.g. two beams with the same spatial direction).

In one or more example methods, the identifier indicative of the antenna panel comprises an antenna panel identifier and/or a beam identifier.

Figure 4:
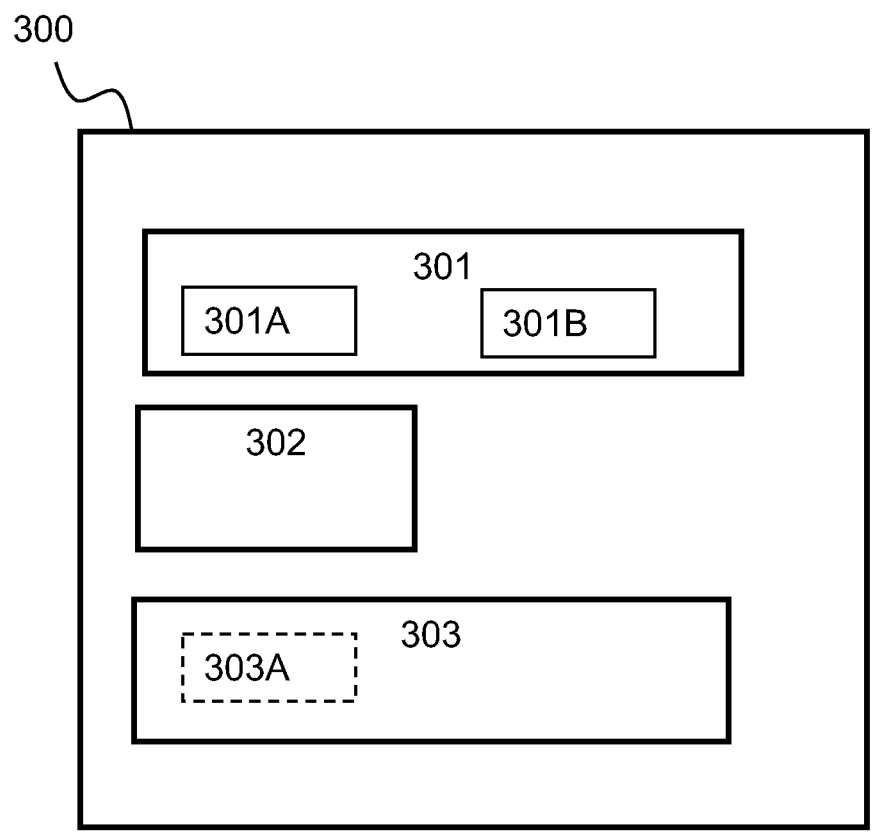
FIG. 4 is a block diagram illustrating an exemplary wireless device according to this disclosure.

FIG. 4 shows a block diagram of an example wireless device 300 according to the disclosure. The wireless device 300 comprises a wireless interface module 301, a processing module 303, and a memory module 302. The wireless interface module 301 comprises a plurality of antenna panels including a first antenna panel 301A and a second antenna panel 301B. The wireless device 300 may be configured to perform any of the methods disclosed in FIG. 2.

The wireless device 300 is configured to communicate with a network node, such as the network node 400 disclosed herein, using a wireless communication system (as illustrated in FIG. 1).

The interface module 301 comprising a plurality of antenna panels is configured for wireless communications via a wireless communication system, such as a 3GPP system, such as a 3GPP system supporting capability reporting.

The wireless device 300 or the processing module 303 is configured to generate (e.g. via a generator module 303A), based on one or more polarization properties of the first antenna panel, a first polarization indicator associated with a first identifier, wherein the first identifier is indicative of the first antenna panel. The first identifier may comprise a first antenna panel identifier and/or a first beam identifier.

The wireless device 300 or the wireless interface module 301 is configured to transmit a capability report to the network node, the capability report comprising the first polarization indicator associated with the first identifier.

In one or more exemplary wireless devices, the wireless device 300 may be configured to perform any of the methods described in FIG. 2.

The processor module 303 is optionally configured to perform any of the operations disclosed in FIG. 2 (e.g. S103, S105, S106, S108). The operations of the wireless device 300 may be embodied in the form of executable logic routines (e.g., lines of code, software programs, etc.) that are stored on a non-transitory computer readable medium (e.g., the memory module 302) and are executed by the processor module 303).

Furthermore, the operations of the wireless device 300 may be considered a method that the wireless module is configured to carry out. Also, while the described functions and operations may be implemented in software, such functionality may as well be carried out via dedicated hardware or firmware, or some combination of hardware, firmware and/or software.

The memory module 302 may be one or more of a buffer, a flash memory, a hard drive, a removable media, a volatile memory, a non-volatile memory, a random access memory (RAM), or other suitable device. In a typical arrangement, the memory module 302 may include a non-volatile memory for long term data storage and a volatile memory that functions as system memory for the processor module 303. The memory module 302 may exchange data with the processor module 304 over a data bus. Control lines and an address bus between the memory module 302 and the processor module 303 also may be present (not shown in FIG. 4). The memory module 302 is considered a non-transitory computer readable medium.

The memory module 303 may be configured to store a capability report in a part of the memory module 303.

Figure 5:
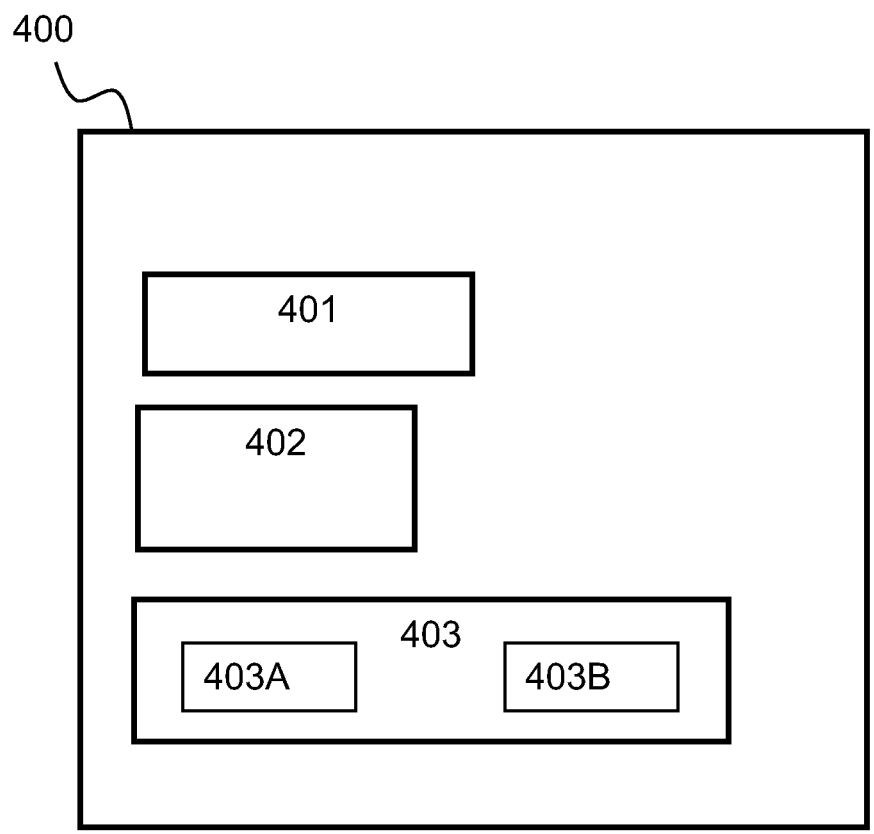
FIG. 5 is a block diagram illustrating an exemplary network node according to this disclosure.

FIG. 5 shows a block diagram of an exemplary network node 400 according to the disclosure. The network node 400 comprises a memory module 401, a processing module 402, and a wireless interface module 403. The wireless interface module 403 comprises a plurality of antenna panels 403A, 403B. The network node 400 may be configured to perform any of the methods disclosed in FIG. 3.

The network node 400 is configured to communicate with a wireless device, such as wireless device 300 disclosed herein, using a wireless communication system (as illustrated in FIG. 1). The wireless interface module 403 is configured to communicate with the wireless device via a wireless communication system, such as a 3GPP system.

The network node 400 is configured to communicate with a wireless device, such as the wireless device 300 disclosed herein, using a wireless communication system (as illustrated in FIG. 1).

The wireless interface module 403 comprising a plurality of antenna panels is configured for wireless communications via a wireless communication system, such as a 3GPP system, such as a 3GPP system supporting capability reporting.

The network node 400 or the wireless interface module 403 is configured to receive a capability report from the wireless device, the capability report comprising a polarization indicator associated with an identifier indicative of an antenna panel of the wireless device.

The network node 400 or the processing module 402 is configured to adapt a transmission strategy to the wireless device according to the polarization indicator received.

In one or more exemplary network nodes, the network node 400 may be configured to perform any of the methods described in FIG. 3.

The processor module 402 is optionally configured to perform any of the operations disclosed in FIG. 3, e.g. 5204A. The operations of the network node 400 may be embodied in the form of executable logic routines (e.g., lines of code, software programs, etc.) that are stored on a non-transitory computer readable medium (e.g., the memory module 401) and are executed by the processor module 402).

Furthermore, the operations of network node 400 may be considered a method that the network node is configured to carry out. Also, while the described functions and operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In a typical arrangement, the memory module 401 may include a non-volatile memory for long term data storage and a volatile memory that functions as system memory for the processor module 402. The memory module 401 may exchange data with the processor module 402 over a data bus. Control lines and an address bus between the memory module 401 and the processor module 402 also may be present (not shown in FIG. 5). The memory module 401 is considered a non-transitory computer readable medium.

Embodiments of methods and products (network node and wireless device) according to the disclosure are set out in the following items:

1. A method, performed in a wireless device, for polarization reporting, wherein the wireless device is configured to communicate with a network node using a plurality of antenna panels of the wireless device, including a first antenna panel, the method comprising:
   generating (S102), based on one or more polarization properties of the first antenna panel, a first polarization indicator associated with a first identifier, wherein the first identifier is indicative of the first antenna panel;
   transmitting (S104) a capability report to the network node, the capability report comprising the first polarization indicator associated with the first identifier.

2. The method according to item 1, wherein the plurality of antenna panels includes a second antenna panel, the method comprising:
   generating (S106), based on one or more polarization properties of the second antenna panel, a second polarization indicator associated with a second identifier, wherein the second identifier is indicative of the second antenna panel;
   transmitting (S108) the capability report to the network node, the capability report comprising the second polarization indicator associated with the second identifier.

3. The method according to any of the previous items, wherein the first identifier indicative of the first antenna panel comprises a first antenna panel identifier and/or a first beam identifier.

4. The method according to any of items 2-3, wherein the second identifier indicative of the second antenna panel comprises a second antenna panel identifier and/or a second beam identifier.

5. The method according to any of the previous items, wherein the first antenna panel forms part of an antenna panel module comprising the plurality of antenna panels.

6. The method according to any of the previous items, wherein the one or more polarization properties of the first and/or second antennal panel comprise a number of polarizations, and/or a frequency band.

7. The method according to any of the previous items, the method comprising:
   determining (S103) if the first polarization indicator associated with the first identifier has been transmitted previously by the wireless device,
   when it is determined that the first polarization indicator associated with the first identifier has not been transmitted previously by the wireless device, transmitting (S104) the capability report to the network node, the capability report comprising the first polarization indicator associated with the first identifier.

8. A method, performed in a network node, for adapting a transmission strategy, wherein the network node is configured to communicate with a wireless device, the method comprising:
   receiving (S202) a capability report from the wireless device, the capability report comprising a polarization indicator associated with an identifier indicative of an antenna panel of the wireless device,
   adapting (S204) the transmission strategy to the wireless device according to the polarization indicator.

9. The method according to item 8, wherein the polarization indicator is indicative of a polarization property of an antenna panel of the wireless device.

10. The method according to item 9, wherein the polarization property comprises a number of polarizations, and/or a frequency band.

11. A method according to any of items 8-10, the method comprising:
   when the polarization indicator indicates a dual polarization, adapting (S204) the transmission strategy to the wireless device according to the polarization indicator comprises enabling (5204A) polarization-based multiple input multiple output, MIMO, communication.

12. A method according to any of items 8-11, wherein the identifier indicative of the antenna panel comprises an antenna panel identifier and/or a beam identifier.

13. A wireless device (300) comprising a wireless interface module (301) comprising a plurality of antenna panels (301A, 301B), a memory module (302), and a processing module (303), wherein the wireless device (300) is configured to perform any of the methods according to any of items 1-7.

14. A network node (400) comprising a wireless interface module (403), a memory module (401), and a processing module (402), wherein the network node (400) is configured to perform any of the methods according to any of items 8-12.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-5 comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed in a wireless device, for polarization reporting, wherein the wireless device is configured to communicate with an associated network node using a plurality of antenna panels of the wireless device, including a first antenna panel and a second antenna panel arranged spaced apart in the wireless device such that the first antenna panel is configured to receive and/or transmit radio signals in a first direction via a first beam, whereas the second antenna panel is configured to receive and/or transmit radio signals in a second direction via a second beam, wherein the first and second beams have different spatial directions, the method comprising:
generating, based on one or more polarization properties of the first antenna panel, a first polarization indicator associated with a first identifier, wherein the first identifier comprises:
a first antenna panel identifier that establishes an identity of the first antenna panel amongst the plurality of antenna panels of the wireless device that is to be used for transmitting a capability report; and
a first beam identifier that indicates the first beam of the first antenna panel of the wireless device that is to be used for transmitting the capability report; and
transmitting the capability report to the associated network node using the first beam of the first antenna panel, the capability report comprising the first polarization indicator associated with the first identifier.

2. The method according to claim 1, the method further comprising:
generating, based on one or more polarization properties of the second antenna panel, a second polarization indicator associated with a second identifier, wherein the second identifier comprises:
a second antenna identifier that establishes an identity of the second antenna panel amongst the plurality of antenna panels of the wireless device that is to be used for transmitting a second capability report; and
a second beam identifier that indicates the second beam of the second antenna panel of the wireless device that is to be used for transmitting the second capability report; and
transmitting the second capability report to the associated network node, the second capability report comprising the second polarization indicator associated with the second identifier.

3. The method according to claim 1, wherein the first antenna panel forms part of an antenna panel module comprising the plurality of antenna panels.

4. The method according to claim 1, wherein the one or more polarization properties of the first and/or second antenna panel comprise a number of polarizations.

5. The method according to claim 1, wherein the one or more polarization properties of the first and/or second antenna panel comprise a frequency band.

6. The method according to claim 1, further comprising:
determining that the first polarization indicator associated with the first identifier has been transmitted previously by the wireless device; and
based on determining that the first polarization indicator associated with the first identifier has not been transmitted previously by the wireless device, transmitting the capability report to the associated network node, the capability report comprising the first polarization indicator associated with the first identifier.

7. The method according to claim 6, further comprising:
based on determining that the first polarization indicator associated with the first identifier has been transmitted previously by the wireless device, forgoing the transmitting of the capability report comprising the first polarization indicator associated with the first identifier, to the associated network node.

8. A method, performed in a network node, for adapting a communication strategy, wherein the network node is configured to communicate with an associated wireless device, the method comprising:
receiving a capability report from the associated wireless device, the capability report comprising a polarization indicator associated with an identifier comprising an antenna panel identifier that establishes an identity of a first antenna panel of the wireless device amongst a plurality of antenna panels of the associated wireless device used for transmitting the capability report, and a first beam identifier that indicates a first beam of the first antenna panel of the associated wireless device used for transmitting the capability report; and
adapting the communication strategy to the associated wireless device according to the polarization indicator associated with the identifier.

9. The method according to claim 8, wherein the polarization indicator is indicative of a polarization property of the antenna panel of the associated wireless device.

10. The method according to claim 9, wherein the polarization property comprises a number of polarizations.

11. The method according to claim 9, wherein the polarization property comprises a frequency band.

12. The method according to claim 8, further comprising:
based on the polarization indicator indicating a dual polarization, adapting the transmission strategy to the associated wireless device according to the polarization indicator by enabling polarization-based multiple input multiple output, MIMO, communication.

13. A wireless device comprising:
a wireless interface module comprising a plurality of antenna panels including a first antenna panel and a second antenna panel arranged spaced apart in the wireless device such that the first antenna panel is configured to receive and/or transmit radio signals in a first direction via a first beam, and such that the second antenna panel is configured to receive and/or transmit radio signals in a second direction via a second beam, wherein the first and second beams have different spatial directions;
a memory module; and
a processing module,
wherein the wireless device is configured to perform a method comprising:
generating, based on one or more polarization properties of the first antenna panel, a first polarization indicator associated with a first identifier, wherein the first identifier comprises:
a first antenna panel identifier that establishes an identity of the first antenna panel amongst the plurality of antenna panels of the wireless device that is to be used for transmitting a capability report; and
a first beam identifier that indicates the first beam of the first antenna panel of the wireless device that is to be used for transmitting the capability report; and
transmitting the capability report to an associated network node using the first beam of the first antenna panel, the capability report comprising the first polarization indicator associated with the first identifier.

14. A network node configured for communication with an associated wireless device, the network node comprising:
a wireless interface module;
a memory module; and
a processing module,
wherein the network node is configured to perform a method of adapting a communication strategy for the communication with the associated wireless device comprising:
receiving a capability report from the associated wireless device, the capability report comprising a polarization indicator associated with an identifier comprising an antenna panel identifier that establishes an identity of a first antenna panel of the wireless device amongst a plurality of antenna panels of the associated wireless device used for transmitting the capability report, and a first beam identifier that indicates a first beam of the first antenna panel of the associated wireless device used for transmitting the capability report; and
adapting the communication strategy to the associated wireless device according to the polarization indicator associated with the identifier.

* * * * *